March 17, 1970     H. W. KOGELNIK     3,501,216

CONTROLLED TRANSMISSION OF WAVES THROUGH INHOMOGENEOUS MEDIA

Filed Dec. 21, 1966     3 Sheets-Sheet 1

PRIOR ART — ORDINARY HOLOGRAPHY

PRIOR ART — WHITE LIGHT RECONSTRUCTION

INVENTOR
*H. W. KOGELNIK*
BY Wilford L. Wiser
ATTORNEY

United States Patent Office

3,501,216
Patented Mar. 17, 1970

3,501,216
CONTROLLED TRANSMISSION OF WAVES THROUGH INHOMOGENEOUS MEDIA
Herwig W. Kogelnik, Summit, N.J., assignor to Bell Telephone Laboratories, Incorporated, Murray Hill and Berkeley Heights, N.J., a corporation of New York
Filed Dec. 21, 1966, Ser. No. 603,551
Int. Cl. G02b 27/02
U.S. Cl. 350—3.5                                6 Claims

ABSTRACT OF THE DISCLOSURE

Holographic methods are disclosed for compensating for the effects of a sufficiently thin diffuser. For example, a hologram of the diffuser is first made in the image plane of the diffuser by recording in that plane the interference between a first light beam that is directed through the diffuser and a converging lens and a second light beam that is a reference. If light that has illuminated an object is then directed through the diffuser, the lens and the hologram, and if the hologram is located in the image plane of the diffuser, a viewer can see an image of the object with little, if any, of the distortions introduced by the diffuser.

---

Related subject matter is disclosed in the concurrently-filed application of D. R. Herriott (application Ser. No. 603,550, and in the concurrently-filed application of R. J. Collier and K. S. Pennington, application Ser. No. 603,496, both assigned to the assignee hereof.

My invention relates to the transmission of waves through inhomogeneous media.

Heretofore, in my copending application Ser. No. 503,287, filed Oct. 23, 1965, and assigned to the asignee hereof, now Patent No. 3,449,577, I have proposed the use of holographic techniques, particularly those employing the conjugate-order image during wavefront reconstruction, to facilitate communication through inhomogeneous media.

I have recognized that it would be desirable to modify the technique to permit a changing scene to be viewed through a distorting medium without changing the hologram employed to compensate the distortions. In other words, a holographic record of the distortions should lack other information concerning the images of objects appearing in the scene and should be in a form that permits the conjugate-order image to be modulated in a meaningful way by the changing scene.

My invention involves the recognition that a clear image of an object may be obtained through a "sufficiently thin" distorting medium by forming a hologram responsive to the optical distortion of the medium with a one-to-one correspondence between respective regions of the hologram and the medium, and reconstructing from the hologram a wavefront that is suitably modulated in response to light scattered from the object through the medium.

Specifically, to make the hologram, an essentially spherical wavefront is projected through the distorting medium and is focused to image the distorting medium in the plane in which an interference pattern is to be recorded.

The distorting medium is "sufficiently thin" for this purpose when it provides substantially only phase distortions without appreciable additional intensity distortion of the transmitted wavefront.

The present invention is particularly useful in television-type communication systems, for facilitating eye contact between communicating persons whose changing images are being transmitted while they talk, inasmuch as a television camera can receive the image of each directly through the viewing screen. The present invention may also facilitate the reduction of the transmission bandwidth in such a system by enabling just the changing portion of a scene to be transmitted.

Other features and advantages of the present inventon will become apparent from the following detailed description, taken together with the drawing, in which.

Figure 1:
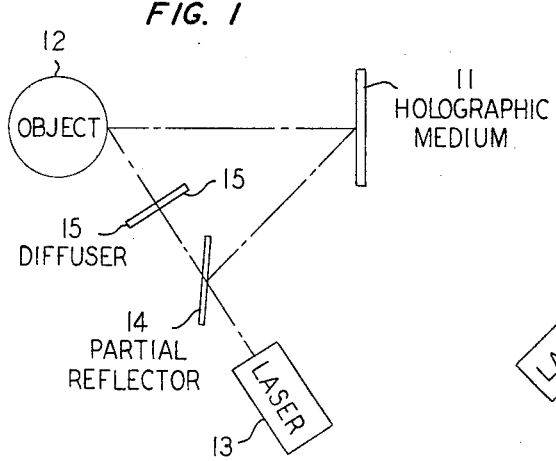
FIG. 1 and FIG. 2 show, in pictorial and block diagrammatic form, successive steps of ordinary holography, according to the prior art.

In FIG. 1, a holographic medium 11, such as a high-resolution photographic film, is exposed by the prior art technique of ordinary holography. The medium 11 is exposed to record the interference pattern formed (1) by a wavefront of phase-related light rays reflected from an object 12 after propagation from a laser 13 through a partially transmissive reflector 14 and a diffuser 15 and (2) by a so-called reference beam of phase-related light rays that are supplied by the laser 13 and reflected from the reflector 14 toward the medium 11 at an acute angle with respect to the incident rays from the object 12. The light of the beam illuminating the object 12 is diffused by the diffuser 15 so that the interference pattern may cover the holographic medium 11.

Figure 2:
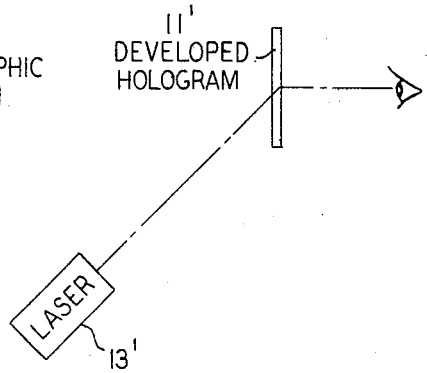

In FIG. 2, according to the prior art technique of ordinary holography, a true image of the object 12 is reconstructed by a beam of light from the laser 13', projected along the line of the original reference beam toward the developed hologram 11'. In this arrangement, a true image is viewed or received upon transmission of the light through the interference pattern recorded in the developed hologram.

Figure 3:
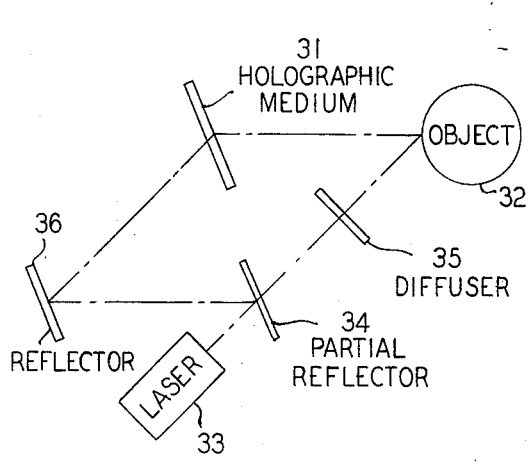
FIG. 3 and FIG. 4 show, in pictorial and block diagrammatic form, successive steps of white light reconstruction holography, according to the prior art.

In FIG. 3, a holographic medium 31, such as a high-resolution photographic film, is exposed in accordance with the prior art technique of white-light reconstruction holography. The medium 31 is exposed to the interference pattern formed (1) by a wavefront of phase-related light rays reflected from an object 32 after propagation from a laser 33 through a partially transmissive reflector 34 and diffuser 35, and (2) by a so-called reference beam of phase-related light rays that are supplied by the laser 33 and reflected from the reflector 34 and the reflector 36 toward the medium 31 at an obtuse angle with respect to, and striking the medium 31 on the opposite side from, the incident rays from the object 32.

Figure 4:
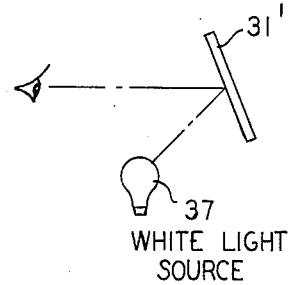

In FIG. 4, the prior art white-light reconstruction technique is illustrated. A true image is reconstructed by white light from the white light source 37 which propagates essentially in the same direction with respect to the developed hologram 31' as did the reference beam. In this arrangement, the image is viewed or received by reflection in a direction that is essentially aligned with the direction of incidence of the original wavefront reflected from the object 32 although that wavefront was incident upon the opposite side of the medium 31, which is now the developed hologram 31'. A further explanation of white-light reconstruction techniques may be found in the article by L. H. Lin et al., Bell System Technical Journal, vol. XLV, April 1966, pp. 659–660.

Figure 5:
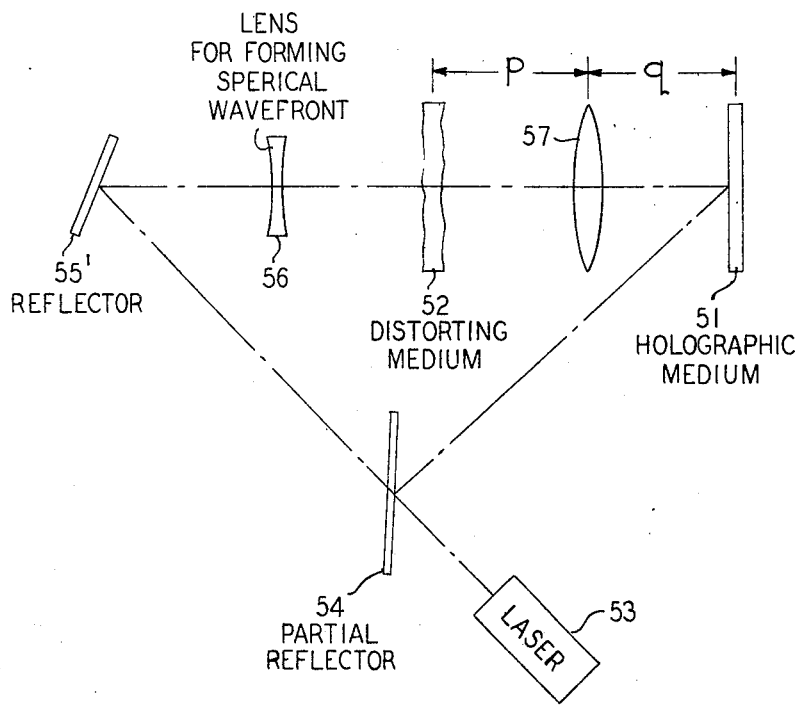
FIG. 5 and FIG. 6 show, in pictorial and block diagrammatic form, successive steps of the basic technique of the invention.

In FIG. 5, a holographic medium 51, such as a high-resolution photographic film that advantageously is as thin as practical, is exposed by the first step of the basic technique of the present invention. The purpose of the exposure is to record the inhomogeneities or distortions of the relatively thin distorting medium 52 so that any arbitrary object subsequently appearing behind the distorting medium 52 can be clearly viewed therethrough.

The medium 51 is exposed by projecting one beam, hereinafter designated the object wavefront, from the laser 53 through the partially transmissive reflector 54 and, illustratively by a further reflection from reflector 55′, through the wavefront-forming lens 56, the distorting medium 52 and the converging lens 57 to fall upon the holographic medium 51 at essentially normal incidence. A second beam, hereinafter designated the reference beam, also participates in the exposure and is formed by the portion of the laser light reflected from the partially transmissive reflector 54 to propagate toward the holographic medium 51 at an acute angle with respect to the direction of propagation of the object wavefront.

The lens 56, illustratively a diverging lens, forms the object wavefront into a spherical wavefront. The converging lens 57 is disposed between the distorting medium 52 and the holographic medium 51 so that the latter is positioned at the image position of the former. In other words, $$\frac{1}{p}+\frac{1}{q}=\frac{1}{f} \quad (1)$$

where $f$ is the focal length of the lens 57, $p$ is the spacing between the distorting medium 52 and the lens, and $q$ is the spacing between the lens and the holographic medium 51. Optionally, in order to provide that the developed hologram does not have a magnification or demagnification effect, the power of the wavefront-forming lens 56 is selected to provide a radius of curvature of the spherical wavefront, at the plane of the medium 51, that is substantially equal to the curvature of the wavefront of the reference beam at the plane of the medium 51. It should be noted that the lens 56 could be replaced with a converging lens placed more than a focal length away from medium 52. The wavefront at medium 52 would still be spherical.

In operation, the two beams expose the holographic medium 51 to form what may be called an "image-hologram," since the use of the lens 57 and the thinness of the distorting medium 52 provide a one-to-one correspondence between distorting regions of the medium 52 and corresponding regions of the medium 51. The distorting medium 52 is sufficiently thin if it provides substantially only one phase distortions without any substantial additional intensity distortion of the transmitted wavefront.

Figure 6:
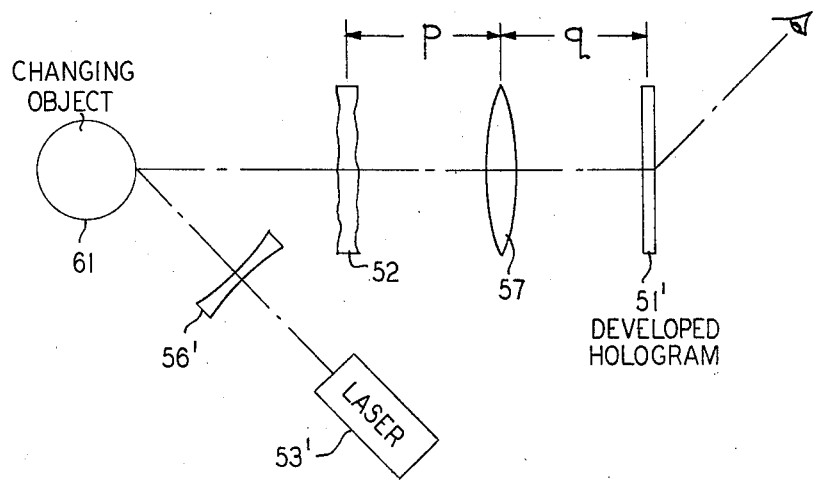

The one-to-one correspondence between distorting regions and regions of the hologram facilitates the cancellation of the effect of the distortions via the employment of the so-called conjugate-order image, during use of the developed hologram, as depicted in FIG. 6.

In FIG. 6, the developed hologram 51′, which was exposed in the manner depicted in FIG. 5, is replaced at the same distance from lens 57. It is illuminated by the light transmitted through the distorting medium 52. With respect to the hologram, this illuminating light is incident essentially parallel to the direction of incidence of the object beam during exposure. The spacing between distorting medium 52 and lens 57 remains the same as in FIG. 5.

Now assume that a changing object 61, such as a moving person, appears behind the distorting medium 52. A laser 53′ illuminates the object, optionally through a lens 56′.

The light transmitted through the hologram 51′ and diffracted in a direction corresponding to the conjugate-order image is affected by the previously recorded interference fringes in such a way that modulation of the diffracted wavefront due to distorting medium 52 is canceled. Mathematically, the cancellation process is described by the multiplication of an exponential term with complex exponent and another exponential term with a complex conjugate exponent so that the resulting wavefront that is available to be viewed, upon transmission through hologram 51′, is merely an amplified or attenuated version of an image of the object 61, as viewed directly.

The basic description of the use of the conjugate-order image for transmission through inhomogeneous media may be found in my above-cited copending patent application. My present invention offers the basic advantages, as compared to that proir technique, that the object 61 may be changed at will without creating a need for any change in the hologram 51′. This result is obtained because a hologram made and used according to the present technique is a record only of the inhomogeneities of the medium 52 alone and is presented in a suitable form.

Figure 7:
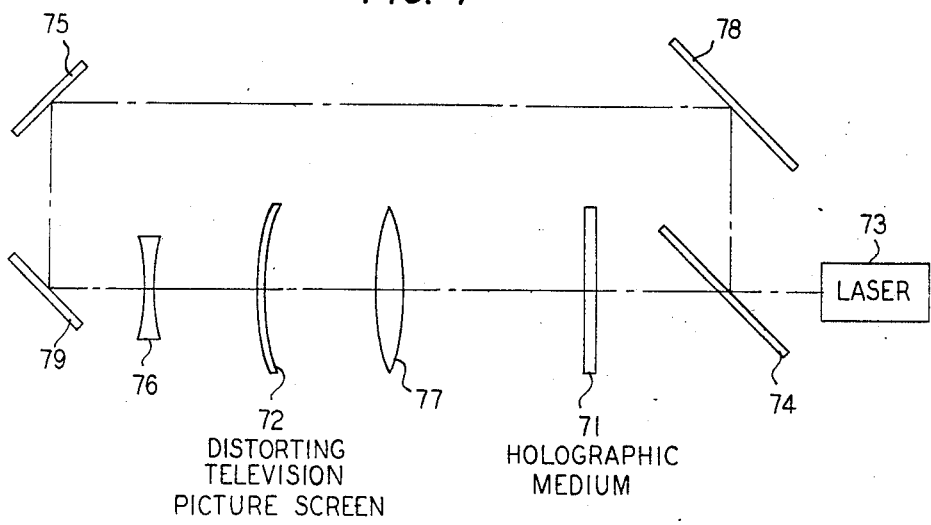
FIG. 7 and FIG. 8 show, in pictorial and block diagrammatic form, successive steps of a preferred white light reconstruction method, according to a species of the invention.
Figure 8:
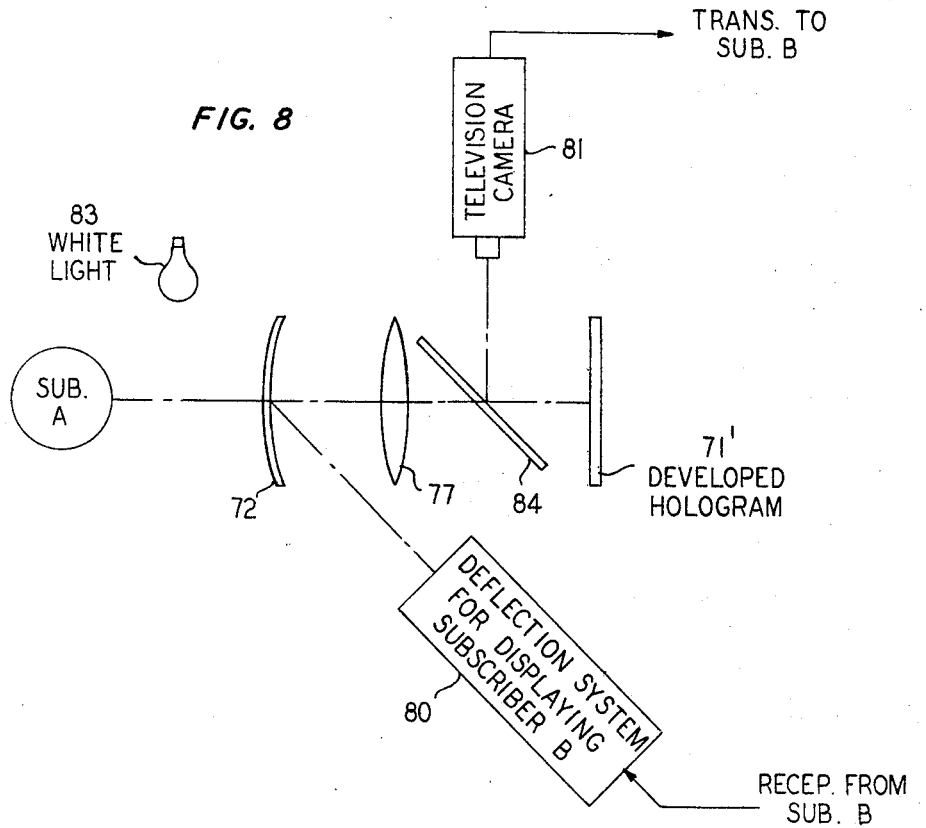

My invention is also applicable to white-light reconstruction techniques. An embodiment involving such techniques is illustrated in FIG. 7 and 8 which depict the application of white-light reconstruction holography to television. The extension of my invention to television is described and claimed specifically in the earlier-mentioned patent application of D. R. Herriott.

In FIG. 7, the holographic medium 71, such as a high-resolution photographic film that desirably has a thickness of at least several light wavelenths, is exposed to spherical wavefronts, incident normally on one side after reflection from reflectors 74, 78, 75 and 79 and transmission through wavefront-forming lens 76, television picture screen 72 and focusing lens 77. Simultaneously, the medium 71 is also exposed to a reference beam, incident upon the opposite side of the medium 71 anti-parallel to the direction of propagation of the object wavefront. The reference beam is transmitted through the partially transmissive reflector 74. Again, the power of the lens 76 is chosen to make the curvatures of the two wavefronts substantially equal at the holographic medium 71. The television screen 72, the lens 77 and the medium 71 are spaced so that the latter is at the image position of the former. The exposure of the holographic medium 71 provides a one-to-one correspondence between distorting regions of the screen 72 and the corresponding image regions in medium 71.

As shown in FIG. 8, the developed hologram 71′ is useful, in a telephone system transmitting subscriber images, to allow the camera to receive the subscriber image directly through the television screen in order to maintain "eye contact" between the subscribers. Heretofore, eye contact has not been feasible because the television screen introduces too much distortion in the image transmitted to the camera.

In FIG. 8, the subscriber A looks directly at the screen 72 and sees a "live" image of subscriber B displayed thereon by the deflection system 80, which responds to the signal received from subscriber B. Simultaneously, subscriber A is illuminated with white light from a source 83. A modulated wavefront, reflected from subscriber A, passes through the distorting screen 72 and is focused by the lens 77, positioned as in FIG. 7, upon the developed hologram 71′, which is in exactly the same position as during exposure of the holograms. The modulated wavefront is incident upon it essentially anti-parallel to the direction of previous incidence of the reference beam with respect to it, during exposure. More exactly, about half of the modulated focused wavefront passes through the partially transmitting reflector 84 and is incident upon the developed hologram 71′. The reflector 84 is oriented obliquely with respect to the direction of transmission of the wavefront.

The diffracted conjugate-order image is reflected from the developed hologram 71′; and a portion of its intensity is further reflected by reflector 84 into the television camera 81. The image is then transmitted to subscriber B by conventional techniques. The use of the conjugate-order image provides that the distorting effects of the television screen 72 are canceled.

The deflection system 80 in FIG. 8 is illustratively a light beam deflection system as disclosed in the copending application of E. I. Gordon, Ser. No. 530,893, filed Mar. 1, 1966, and assigned to the assignee hereof. The television screen 72 is illustratively a frosted glass plate or Fresnel plate.

In both of the foregoing embodiments of the invention, the holographic medium may alternatively be a thermoplastic film or an Eidophor film, which is typically an oil film that can acquire different phase-retardation properties in different regions as a function of the intensity of light falling on each region. Further, any other means for recording an interference fringe pattern may be used. Preferably, the developed hologram should be as transmissive as possible. For this reason, a hologram made from photographic film is advantageously bleached to convert intensity variation into phase-retardation variations.

The latter type of hologram is called a phase hologram. Inasmuch as the hologram is formed by imaging the distorting medium upon the holographic medium, such holograms could also be called phase-type image-holograms.

In both of the foregoing embodiments, the choice of the lasers is entirely optional, although it is desirable that the laser have an intensity sufficiently high to permit the usual losses. Especially, the laser 53' of FIG. 6 should be powerful enough to yield a bright conjugate-order image. While normal illumination is desirable in FIG. 8, the sensitivity of camera 81 is sufficient to detect the conjugate-order image. Normally, the camera 81 would include a field lens to gather as much diffracted light as possible.

When a photographic film is used to practice the invention, it is typically necessary to provide shuttering techniques to protect it from low-level background radiation before and after exposure. It is also typically necessary to remove the photographic film, develop it and replace it. Nevertheless, none of these steps are inherently limitations of the present invention.

Various other modifications of the present invention, within its spirit and scope, should be apparent to those skilled in the art. For example, it should be understood that the use of planar wavefronts is a special case of the use of spherically curved wavefronts in which the radius of curvature for a planar wavefront is infinite. Moreover, while the disclosed embodiments provide essentially single-color reconstruction, the technique of the invention is compatible with full-color white-light wavefront reconstruction techniques. A further extension of the present invention, employed to reduce transmission bandwidth in a television-type system by transmitting only the changing portion of a scene, is disclosed and claimed in the above-mentioned application of R. J. Collier and K. S. Pennington.

What is claimed is:

1. A method of obtaining clear images of objects through a distorting medium that provides substantially only phase distortions, comprising the steps of:
   recording a hologram of the distorting medium in which each different region recorded of the distorting medium is recorded on a different region of the hologram, thereby establishing a one-to-one correspondence between regions of the distorting medium and regions of the hologram, and
   reconstructing from the hologram a conjugate-order diffracted wavefront by:
      illuminating the object to scatter light therefrom, distorting portions of the scattered light with regions of the distorting medium, whereby a one-to-one correspondence is established between each portion of the light that is distorted and each region of the distorting medium that distorts the light, and
      directing each distorted portion of the scattered light upon the region of the hologram that is in one-to-one correspondence with the region of the distorting medium that distorts the light.

2. A method of obtaining a clear image of an object through a distorting medium that provides substantially only phase distortions, comprising the steps of:
   forming an interference pattern responsive to the optical distortion of said medium, including the steps of:
      projecting an essentially spherical coherent light wavefront through said medium,
      directing a coherent reference beam, having a constant phase relation to said wavefront, to interfere with said wavefront after said wavefront has passed through said medium,
      focusing said wavefront to image the distorting medium in a plane of interference of said wavefront and said beam,
      recording the interference pattern in said plane, and
   reconstructing a modulated wavefront from the record, including the steps of:
      illuminating a modulating object to scatter light through said distorting medium,
      focusing the light scattered through the distorting medium upon the record of the interference pattern located in the image plane of the distorting medium to provide the conjugate-order diffracted portion of the focused light as an output from which an image of the modulating object can be found.

3. A method according to claim 2 in which the directing step includes directing the reference beam to propagate at an acute angle with respect to the direction of propagation of said wavefront and in which the forming step includes adapting the curvatures of the projected wavefront and the wavefront of the reference beam to be substantially equal at the image plane.

4. A method according to claim 2 in which the directing step includes directing the reference beam to propagate essentially in the opposite direction with respect to the direction of propagation of the spherical light wavefront, and in which the reconstructing step includes as a final step the receiving of the reflected part of the conjugate-order diffracted portion of the focused light, whereby the illumination of the object may be incoherent.

5. A method according to claim 2 in which the projecting step includes the step of forming the essentially spherical projected wavefront with a first curvature that is converted by the first focusing step to a second curvature at the image plane, which second curvature is substantially equal to the curvature of the wavefront of the reference beam at the plane in which the interference pattern is recorded.

6. A method of obtaining clear images of objects through a distorting medium that provides substantially only phase distortions, comprising the steps of:
   forming an interference pattern responsive to the optical distortion of said medium, including the steps of:
      projecting an essentially spherical coherent wavefront through said medium,
      directing a coherent reference beam, having a constant phase relation to said wavefront, to interfere with said wavefront in a photographic film after said wavefront has passed through said medium,
      focusing said wavefront before interference in said film to render the image plane with respect to said distorting medium coincident with said film,
   developing said film, restoring the developed film to said image plane, and reconstructing a modulated wavefront from the developed film, including the steps of:
  illuminating a modulating object to scatter light through said distorting medium,
  focusing the light scattered through the distorting medium upon the developed film located at the image plane with respect to the distorting medium, and
  receiving the conjugate-order diffracted portion of the focused light.

References Cited

Leith et al., Jour. of the Optical Soc. of Am., vol. 56, No. 4, April, 1966, p. 523.

Upatnieks et al., Applied Optics, vol. 5, No. 4, April 1966, pp. 589–593.

DAVID SCHONBERG, Primary Examiner

R. J. STERN, Assistant Examiner

U.S. Cl. X.R.

178—6.7